US010755203B1

(12) United States Patent
Elliott et al.

(10) Patent No.: US 10,755,203 B1
(45) Date of Patent: Aug. 25, 2020

(54) METHODS OF RESERVING AND MANAGING VACATION RENTAL PROPERTIES

(71) Applicants: Richard F. Elliott, North Myrtle Beach, SC (US); Craig Lucas, Sunset Beach, NC (US)

(72) Inventors: Richard F. Elliott, North Myrtle Beach, SC (US); Craig Lucas, Sunset Beach, NC (US)

(73) Assignee: VACATION FINDER, LLC, North Myrtle Beach, SC (US)

( * ) Notice: Subject to any disclaimer, the term of this patent is extended or adjusted under 35 U.S.C. 154(b) by 1078 days.

(21) Appl. No.: 13/919,435

(22) Filed: Jun. 17, 2013

Related U.S. Application Data

(60) Provisional application No. 61/790,220, filed on Mar. 15, 2013.

(51) Int. Cl.
  *G06Q 10/02* (2012.01)
  *G06Q 50/16* (2012.01)

(52) U.S. Cl.
  CPC ............. *G06Q 10/02* (2013.01); *G06Q 50/16* (2013.01)

(58) Field of Classification Search
  CPC ............... G06Q 10/02; G06Q 30/0645; G06Q 30/0609; G06Q 30/0613; G06Q 30/0611
  See application file for complete search history.

(56) References Cited

U.S. PATENT DOCUMENTS

| | | | |
|---|---|---|---|
| 9,177,268 B2 | 11/2015 | Salonen | |
| 2003/0074557 A1* | 4/2003 | Vatanen | G06F 21/6209 713/168 |
| 2003/0225599 A1* | 12/2003 | Mueller | G06Q 10/02 705/5 |
| 2008/0065429 A1* | 3/2008 | Galloway | G06Q 10/02 705/5 |
| 2008/0215384 A1* | 9/2008 | Mulholland | G06Q 10/02 705/5 |
| 2009/0287596 A1* | 11/2009 | Torrenegra | G06Q 40/04 705/37 |
| 2010/0287108 A1* | 11/2010 | Baron | G06Q 10/10 705/313 |
| 2011/0015954 A1 | 1/2011 | Ward | |
| 2013/0174085 A1* | 7/2013 | Pearsall | G06Q 10/00 715/784 |
| 2016/0162874 A1 | 6/2016 | Salonen | |

OTHER PUBLICATIONS

Rissoff, Alexa. "Are You Registered? an Analysis of Buffalo's Rental Registry Code." (2009) (Year: 2009).*

* cited by examiner

*Primary Examiner* — George Chen
(74) *Attorney, Agent, or Firm* — Thrive IP; Bernard S. Klosowski (57) ABSTRACT

Systems and methods include interactive concierge shops wherein an initial web page displays at least one active link associated with a rental property wherein a registered property owner having a rental management contract with a local vacation rental company, a host, and a computer user are each third parties with respect to one other; and, using retrieved data from each of the registered property owner, the host, and the computer user, the concierge shops generate and transmit to a web browser of the computer user a subsequent web page that displays information associated with the locally managed rental property including a view of the property corresponding to the information.

7 Claims, 12 Drawing Sheets

Figure 3A from Figure 3A

```
        <script type="text/javascript">
        jQuery = jQuery.noConflict();
        jQuery(function() {
                jQuery('.map').maphilight({fillColor: '8CC541',fade: false});
                jQuery("area").vfmappingtip();
        });
        </script>

</script type="text/javascript">
    function A(URL,COORDS,ALT,LINK) {
        document.write('<AREA SHAPE="poly"');
        if(URL!="")
        document.write('HREF="http://vacationfinder.com/' + URL + '"');
        document.writeln('COORDS="' + COORDS + '" title="' + ALT + '" class="' + LINK + '">')
    }
        </script>

<style type="text/css">
        <!-- vfmappingtip{
                padding:5px 5px 5px 25px;
                background://fff url(http://vacationfinder.com/destinationmapping/images/pin.png) left center no-repeat;
                color:#26639B;
                -webkit-border-radius: 5px;
                -moz-border-radius: 5px;
                border-radius: 5px;
                -webkit-box-shadow: 3px 3px 3px rgba(0, 0, 0, 0.3);
                -moz-box-shadow: 3px 3px 3px rgba(0, 0, 0, 0.3);
                box-shadow: 3px 3px 3px rgba(0, 0, 0, 0.3);
                text-align:center;
                font-family:"Lucinda Sans Unicode", "Lucinda Grande", sans-serif;
                font-size:13px;
                text-shadow: #000 1px 0 0 ;
                border:1px solid #35A8DE;
                }

-->
    </style>
<!--[if it IE 9]>
                <link rel="stylesheet" href="css/ie.css" type="text/css" media="screen">
                <script type="text/javascript" src="http://vacationfinder.com/destinationmapping/js/html5.js"></script>
        <![endif]-->
<base target=" top">

</head>

<body topmargin="0" leftmargin="0">

<div class="container_12" style="width: 960px; height: 1062px">
                <div class="margin-bot5">
<article class="grid 12">
<div class="bg-1 border_r_r-1 border-2">
                                <div class="indent">
                                        <table border="0" width="920" cellspacing="0" cellpadding="0">
```

Figure 3B to Figure 3C from Figure 3B

```
<tr>
                                                                                      <td width="500">
                                                                                      <h1
align="left">Find                                                                     Vacation Rental
Condos &                                                                          Houses</h1>

</td>
                                                                                      <td valign="top">
                                                                                      <p align="right">
                                                                                      <h7 align="right"><a
href="http://vacationfinder.com/how-it-works">
                                                                                      How it Works</a> |
List Your
                                                                                      Property | Owner /
Agent
                                                                                      Login | Help<h7></
td>
                                                                                      </tr>
                                                                    </table>
                          <div class="wrap bg-2 border-2 border_r">
                              <div class="indent1">
                                  <ul class="tabs">
                                      <li><a href="#tab1" class="m1"><span>USA Map</span></a></li>
                                      <li><a href="#tab2" class="m2"><span>Caribbean Map</span></a></li>
                                      <li><a href="#tab3" class="m3"><span>World Map</span></a></li>
                                  </ul>
                                  <div class="tab container fleft">
                                                                                      <div
id="tab1" class="tab_content">
                                          <p align="center">
<img ud="usa" class="map" src="http://vacationfinder.com/destinationmapping/js/usa/usa2.png" alt="" usemap="#usa" width="600"
height="400" style="border-style:none" />
<map name="usa">

<script type="text/javascript" src="http://vacationfinder.com/destinationmapping/js/usa/usa.js"></script></map>
                                          </div>
                                                                                      <div
id="tab2" class="tab content">
<p align="center">
```

Figure 3C to Figure 3D from Figure 3B

```
<script type="text/javascript" src="http://vacationfinder.com/destinationmapping/js/caribbean/caribbean.js"></script>

</map>
                                </
div>
                                <div id="tab3" class="tab content">
                                  <p align="center">

<br>

<br>
                                <img id="world" class="map" src="http://vacationfinder.com/destinationmapping/js/world/world.png"
alt="" usemap="#world" width="580" height="280" style="border-style:none" /></div>

<map id="world" name="world">

<script type="text/javascript" src="http://vacationfinder.com/destinationmapping/js/world/world.js"></script>
</map>

</div>
                                      </div>
                                                                                        <div
class="clear"></div>
                                        </div>
                                       </div>
                                      </div>
                                     </div>
                                    </article>
                                     <div class="clear"></div>
                                    </div>
                                   </div>
                                  </div>
</section><p align="center"> </p>
```

Figure 3D usa.js

Figure 4

METHODS OF RESERVING AND MANAGING VACATION RENTAL PROPERTIES

CROSS-REFERENCE TO RELATED APPLICATIONS

This utility patent application claims benefit of U.S. Provisional Application Ser. No. 61/790,220, filed Mar. 15, 2013, which is incorporated herein by reference thereto.

BACKGROUND OF THE DISCLOSURE

Conventional vacation rental websites are passive and lack functionality. Such sites do not assure customers of professional services or satisfaction. Moreover, owners of properties posted on conventional vacation rental websites are often inaccessible when guests have problems with the rental properties. To make matters worse, a guest or renter may have to wait for days to have an issue resolved, but ruined vacation time is irreplaceable.

What is needed in the industry is a website that will provide renters with locally professionally managed rental properties and much needed functionality such as dynamic mapping when a user "mouses" over a potential destination location to highlight the destination and display the location to the user. The needed website should organize potential destination pages to permit the user to navigate to the destination and to upload the destination when selected by the user. The website should offer users a search-and-suggest feature and provide a property owner an ability to upload rental contracts, logos, photographs, website addresses and other information in real time.

The desired website should also offer the owner or agent an ability to allow a user to view other properties listed by the owner or agent. The needed website should be fast, efficient and easy to use by consumers, rental agencies and property owners alike.

BRIEF SUMMARY OF THE DISCLOSURE

The present disclosure is directed broadly to an online vacation rental by owner marketplace that has access to hundreds of properties around the world. All of the properties listed on concierge websites of the present disclosure have rental management contracts with local vacation rental companies, property management companies or licensed agents. This requirement creates a win-win for both the property owner and the guest. The property owner has complete control of his inventory as well as the ability to negotiate rental rates directly with his guests. Renters or "guests" will find the best deal possible for their rental and have the full support of a local, professional service organization to resolve any questions, problems or maintenance issues that may come up during their stay.

According to one aspect of the present disclosure, a method of electronically selecting and reserving a rental property includes entering a keyword into a search portal or selecting a destination site; causing the keyword or the destination site to translate a source code into an executable code; and causing the executable code to return a suggested property or the destination site to a user. The suggested property may be multiple properties.

The method may further include sorting the properties; sharing the suggested property(ies) to a social media website; viewing the suggested property by selecting photographs, slides or icons; and/or storing user details into a MySQL database.

According to another aspect of the disclosure, a method of electronically renting properties includes entering a rental property address into a property page portal; entering rental property details; and setting a rental budget and value by entering property parameters.

The method according to this embodiment may also include creating an advertisement for the property; selecting a potential income calculator based on the property parameters; selecting a statistics tracking feature; selecting a geographical distribution of interest feature; and/or uploading a rental management contract.

According to a further embodiment, a method of electronically renting properties may include entering desired rental property details; entering rental property details; and setting a rental budget and value by entering property parameters.

The desired rental property criteria according to this exemplary method may be selected from an arrival date, a departure date, number of adults, number of children, desired amenities, and/or a desired price range.

The method may further include finding a best match based on the rental property criteria; finding the best match based on the rental property criteria; sending notification of competing quotes to a user; and/or reserving a property.

Additional aspects of the present subject matter are set forth in, or will be apparent to, those of ordinary skill in the art from the detailed description herein. Also, it should be further appreciated that modifications and variations to the specifically illustrated, referred and discussed features and elements hereof may be practiced in various embodiments and uses of the disclosure without departing from the spirit and scope of the subject matter. Variations may include, but are not limited to, substitution of equivalent means, features, or steps for those illustrated, referenced, or discussed, and the functional, operational, or positional reversal of various parts, features, steps, or the like. Those of ordinary skill in the art will better appreciate the features and aspects of such variations upon review of the remainder of the specification.

BRIEF DESCRIPTION OF THE DRAWINGS

A full and enabling disclosure of the present subject matter, including the best mode thereof, directed to one of ordinary skill in the art, is set forth in the specification, which makes reference to the appended figures, in which.

DETAILED DESCRIPTION OF THE DISCLOSURE

Detailed reference will now be made to the drawings in which examples embodying the present subject matter are shown. The detailed description uses numerical and letter designations to refer to features of the drawings. Like or similar designations of the drawings and description have been used to refer to like or similar parts of various exemplary embodiments.

The drawings and detailed description provide a full and written description of the present subject matter, and of the manner and process of using various exemplary embodiments, so as to enable one skilled in the pertinent art to use them, as well as the best mode of carrying out the exemplary embodiments. However, the examples set forth in the drawings and in the detailed description are provided by way of explanation only and are not meant as limitations of the disclosure. The present subject matter thus includes any modifications and variations of the following examples as come within the scope of the appended claims and their equivalents.

According to one aspect of the disclosure, an online vacation-rental-by-owner marketplace is provided using a concierge website with has access to hundreds of properties around the world. All properties listed on the concierge website have rental management contracts with local vacation rental companies, property management companies, or licensed agents in proximity to the properties. This feature is advantageous for both a property owner and a guest. The owner has control of his inventory and the ability to negotiate rental rates directly with guests. The guests find their best deal possible and have the full support of a local, professional service organization to resolve any questions, problems or maintenance issues that may come up during their stay.

According to an aspect of the disclosure, from a perspective of a property owner, the owner may use a potential income calculator on the site as a first step, or proceed immediately to list a property on a concierge website such as www.vacationfinder.com. Exemplary questions that the site will prompt for responses from the property owner are:

"Do you [the owner] have a rental contract with a rental agency or agent?"

"On average, how many weeks or days is the property rented per year? Of this average total, approximately how many days do you rent yourself?"

"Are any of your properties currently listed on other vacation-rental-by-owner sites? Have you tried using vacation-rental-by-owner sites but no longer use them?"

"How much do you currently pay for advertising on, e.g., rental-by-owner websites?"

"Will your present rental management company allow rentals by owner?"

Some conventional rental companies prohibit rentals by owner. The present disclosure, however, provides the property owner with control and management of a vacation rental-by-owner website. The interactive website permits the property owner to manage all properties and also offers full time technical support. In one embodiment, all rental properties will have a current rental contract with a licensed vacation rental or management company. The site helps the owner build lasting relationships with guests, which will effect repeat business and help protect property.

According to an embodiment, multiple pricing plans are available. For instance, the site may offer three pricing plans. An entry level plan, which might be designated a Bronze level, may be begin at around $100.00 a year. This entry level may include a limited number of pictures, such as between 20 to 30, more particularly 25 (and may also include a slideshow). The Bronze level may also include a property feature and amenity list, a reviews section, an interactive map, an owner's profile, and rate details. In addition, the Bronze-designated property will be randomly rotated in search results.

A mid-tier level may be designated Silver and begin at around $150.00 a year. This level may include up to 25 pictures (which includes a slideshow), property feature and amenity list, a reviews section, an interactive map, an owner's profile, and rate details. The property will be randomly rotated in search results. In addition, the property will be featured on the "Condo or house page" of the site, based on property type.

A top level or Gold designation may begin at around $200.00 annually and includes approximately 25 pictures (plus slideshow), a property feature and amenity list, a reviews section, an interactive map, an owner's profile, and rate details. The property will be randomly rotated in search results. In addition, the property will be featured on the Condo or house page, based on property type and featured on the owner's city page.

In addition to easy payment plans, other advertising opportunities are available using a pay-per-click system. Payments can be made directly on the site, e.g., www.vacationfinder.com, using most major credit cards or by using electronic accounts such as PayPal®. Payments may also be made by calling a toll free number or by emailing the site such as at info@vacationfinder.com According to an aspect of the disclosure, from a perspective of a renter or guest vacationer, a concierge website, e.g., www.vacationfinder.com, simplifies and streamlines vacation planning while providing a guest a selection of deals and competitive prices.

According to an aspect of the disclosure, the concierge website helps the guest find the perfect property for the guest family in the desired destination area using an interactive map.

The concierge website provides background and contact information for both the homeowner and the local rental agent who will be providing assistance if needed during a guest stay.

Payment can be made directly to the homeowner after submitting appropriate information on a form on the concierge website. The form is automatically emailed to the homeowner so there is no middleman. The concierge website is a one stop shop for all vacation needs. Research, booking, planning, travel, check-in, and review are all seamlessly integrated.

Unlike most rental sites having a limited selection, the concierge website will offer the greatest selection of properties because it exclusively deals with properties that have existing contracts with local rental companies. Therefore, the concierge website can guarantee the lowest prices for guests.

The concierge website offers check in and out with a local rental company, which will provide support and local information, whereas owner may not always be accessible with conventional arrangements. Where keys may be mailed, left in a mailbox, left under a welcome mat, etc. in conventional rental situations, the concierge website and its related systems offers twenty-four hour support for guests through local rental companies. This provides peace of mind for those who may have experienced ruined vacations in the past waiting for days to have issues resolved.

A guest can locate his ideal rental in a few mouse clicks on the concierge website whereas most vacation rental sites require 6-8 clicks to even begin a search.

Figures 1, 1A:
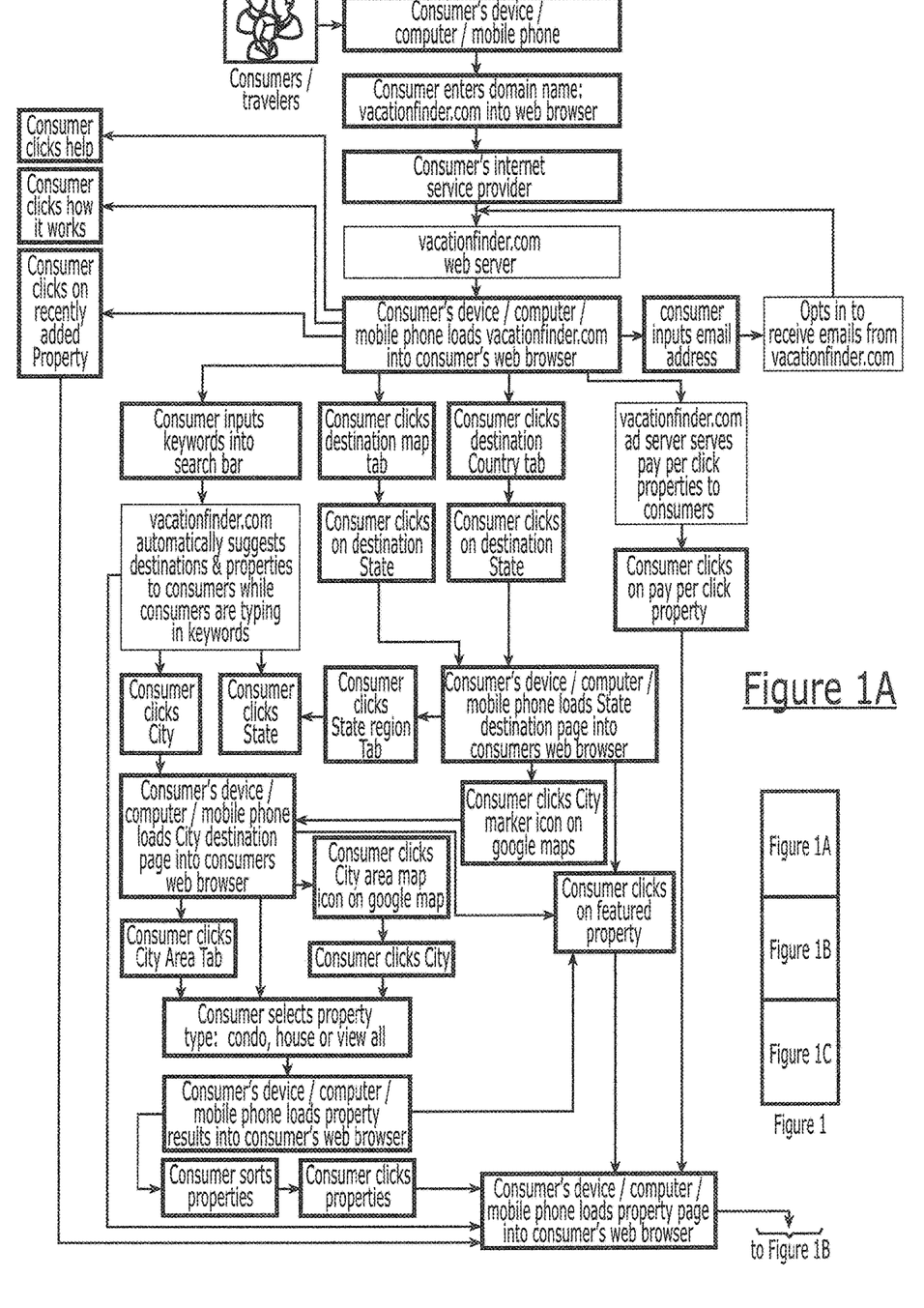
FIGS. 1A-1C form a flowchart showing aspects of the present disclosure according to a viewpoint of a traveler or vacationer.

Turning now to FIG. 1A, according to an aspect of the disclosure a consumer or user may select a host site such as www.vacationfinder.com. As shown, the consumer may seek a desired destination, view managed properties and begin the selection process.

Figure 1B:
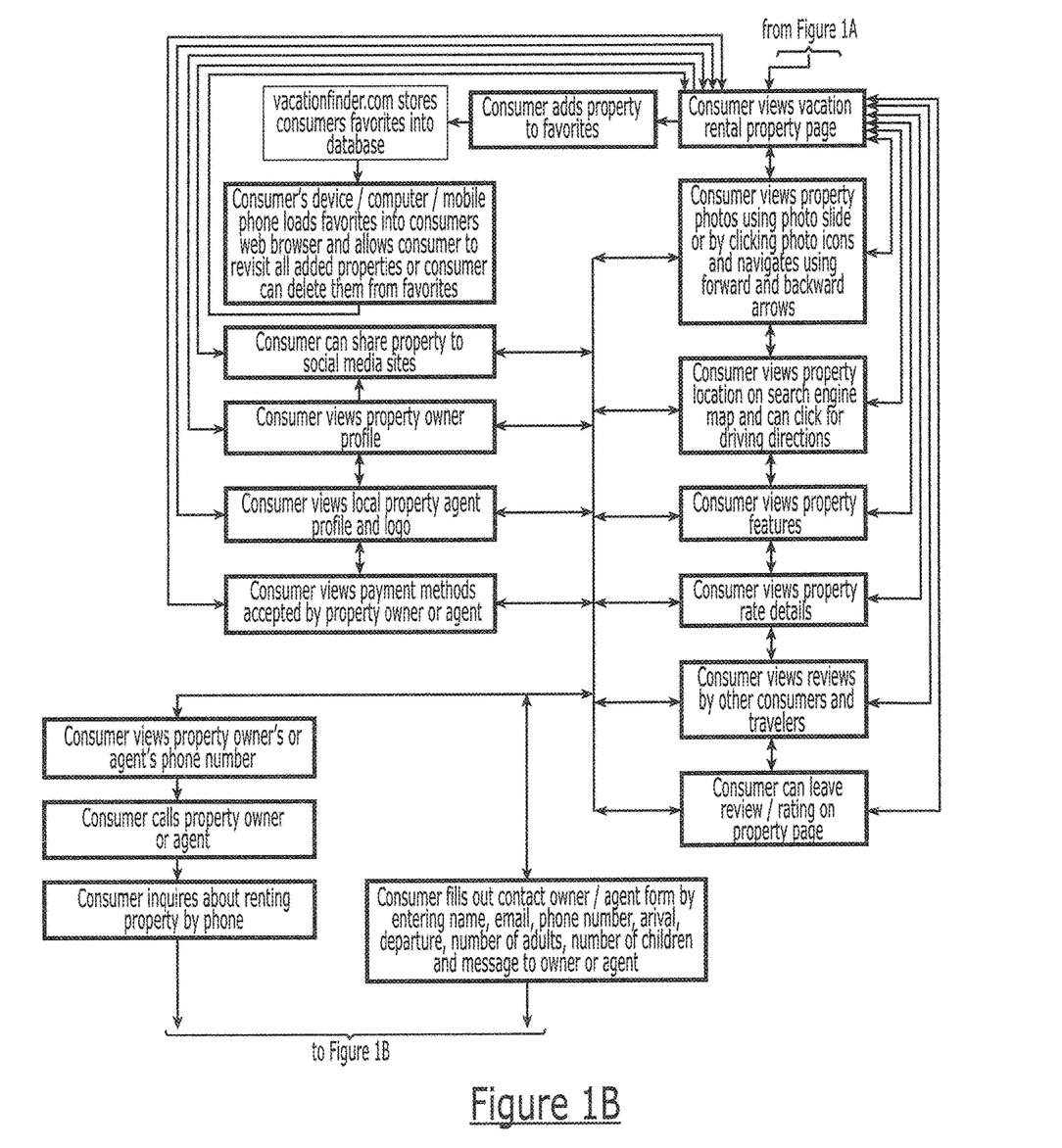

More particularly, according to FIG. 1B, the consumer may view the property owner profile as well as a local property agent profile. If interested, the consumer share and view potential rental properties with family or friends using various computers, mobile devices, applications, and social media sites. The consumer can inquire about a particular property by contacting the property owner or agent.

As used herein, "Source Code" refers to lines of code programmed into a computer. Said Source Code is human-readable but is incomprehensible to a computer operating system and cannot be executed directly by the computer prior to compilation. Said Source Code must be translated to a file of basic CPU (central processing unit) instructions by a compiler.

"Object Code" or "Target Code" as used herein refers to an intermediate form of code between Source Code and Executable Code. Given a device for transforming programs from one form to another, Source Code is input to a device, and Object Code is output. Said Object Code is not human readable but can be executed by the computer. Said Object Code is a step between the compiler and a linker; i.e., the compiler converts the Source Code into the Object Code, which is then passed to the linker to become Executable Code, as defined below.

"Executable code", "Machine Code", "Processor Language" or "Machine Language" as used herein refers to code that can run directly on a computer; i.e., said Executable Code can be immediately executable (i.e., runnable as a program), or may require linking with other Object Code files (e.g. libraries) to produce a complete executable program. Said Executable Code is obtained by compiling the Source Code into Object Code and the Object code is converted to Executable Code through the process of linking together the Object code.

Executable or Machine Code ordinarily may stand alone. On the other hand, Object Code is linked with other Object Code to build the Machine Code (or still greater Object Code.

Figure 1C:
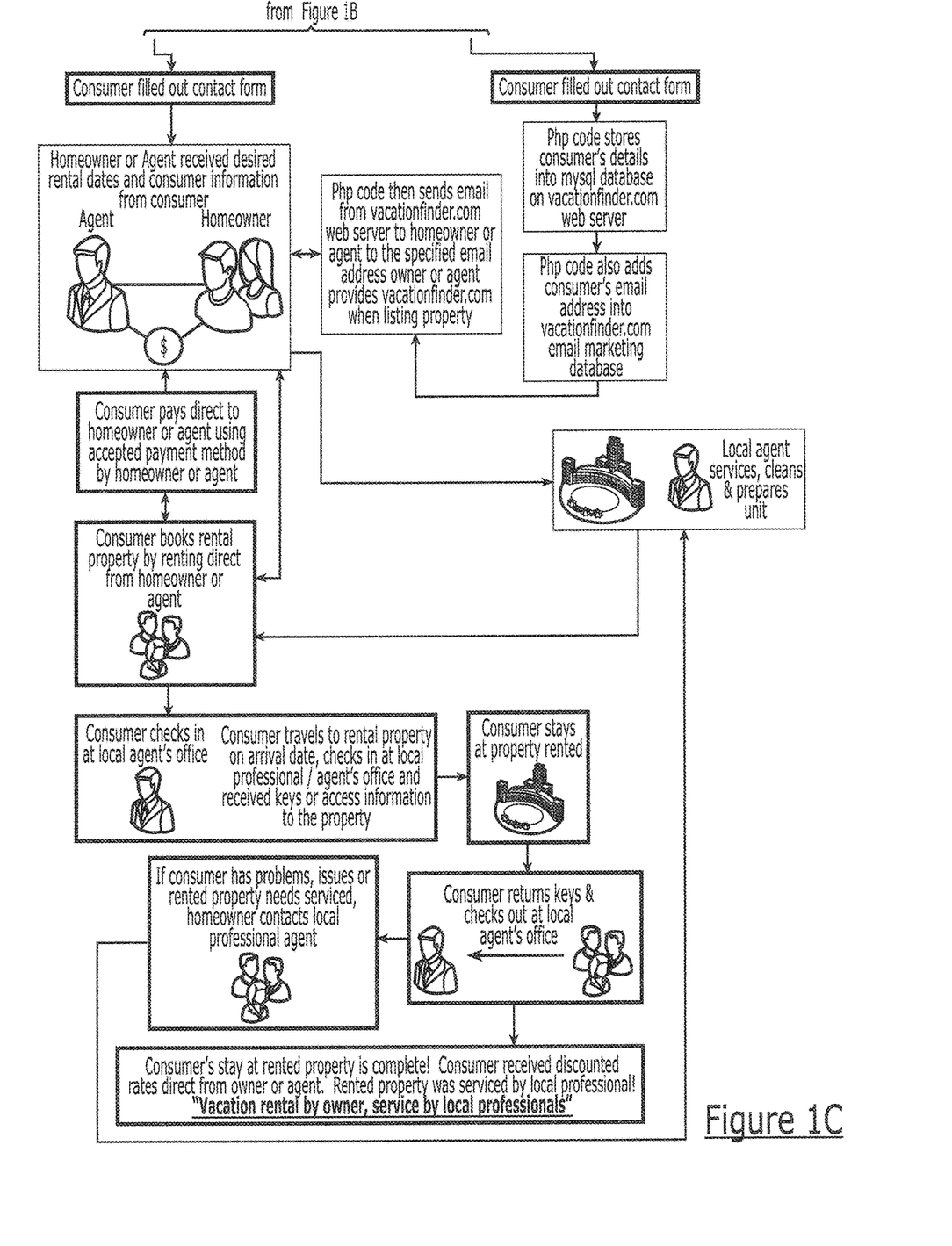

A general-purpose programming language, such as PHP (Hypertext Preprocessor) may be used as in FIG. 1C. Here, according to an aspect of the disclosure, PHP code stores the consumer's details into a MySQL database on vacationfinder.com. Those skilled in the art will understand that Structured Query Language (SQL) is a special-purpose programming language (the "My" portion is named after the language co-founder Michael Widenius' daughter).

As further shown in FIG. 1C, the consumer rents the desired property, checks in at a local professional agent's office and receives keys or access information to the property. If the consumer has problems, issues or rented property needs, the local professional agent is contacted for immediate real time service.

Figures 2, 2A:
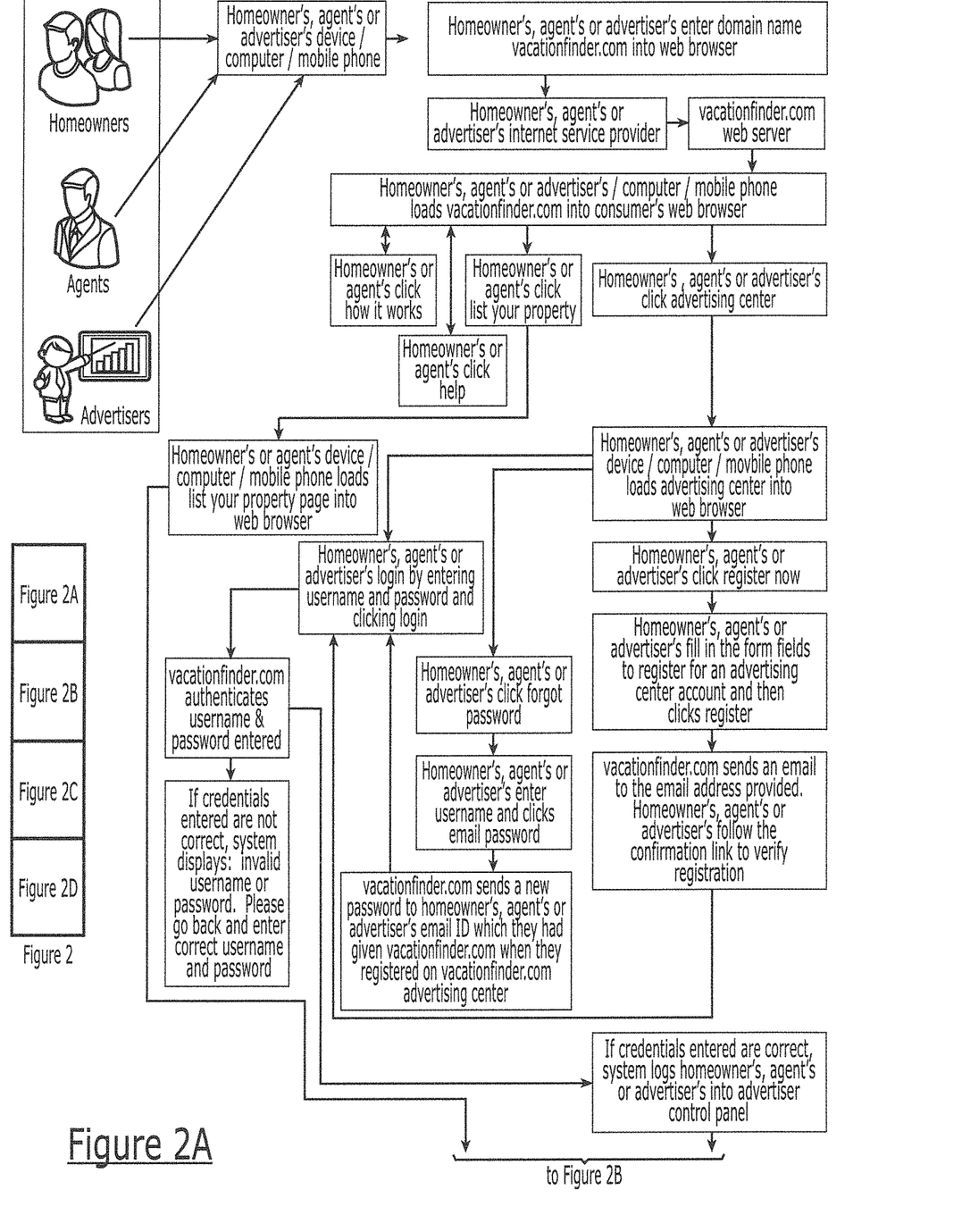
FIGS. 2A-2D form a flowchart showing aspects of the present disclosure according to a viewpoint of property owner.
Figure 2B:
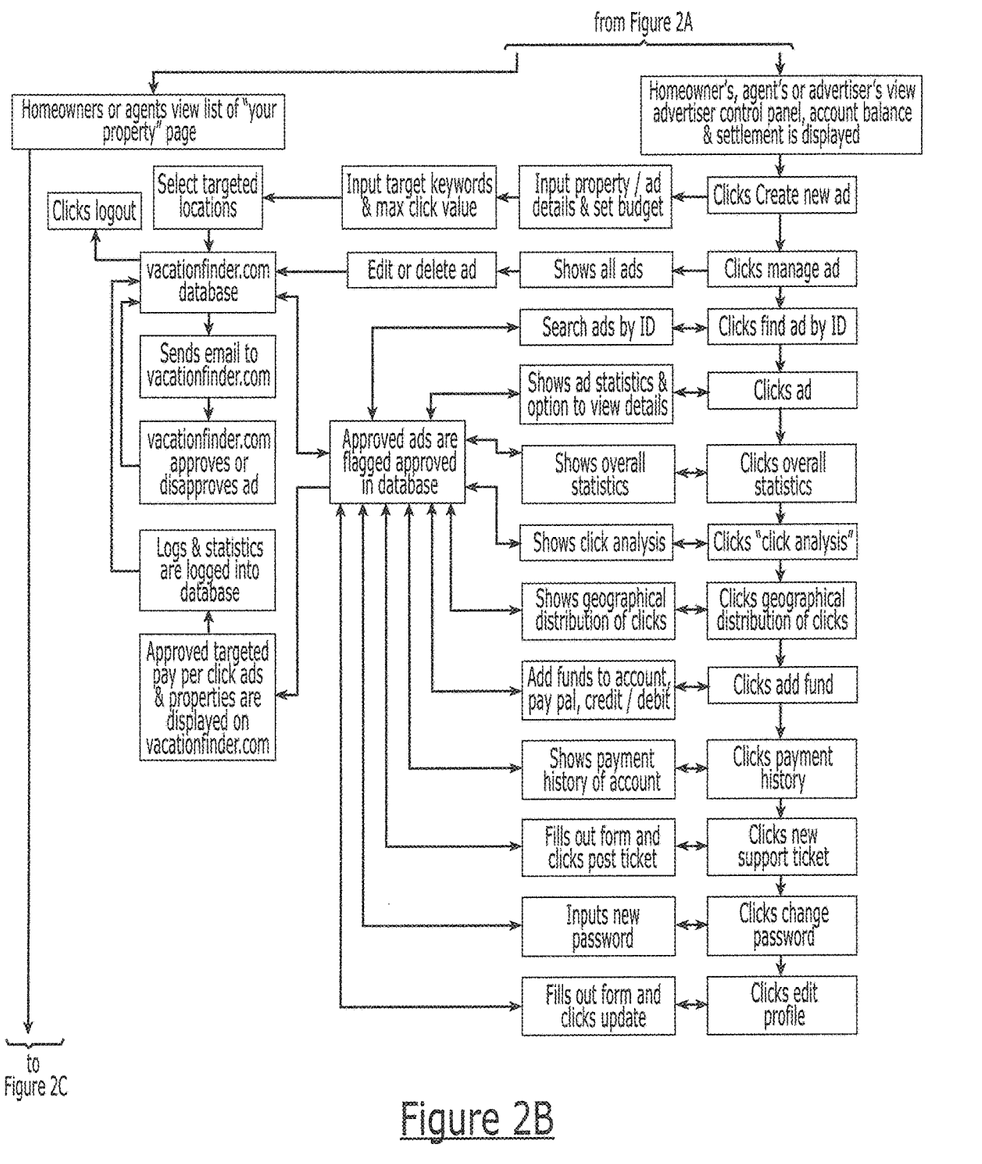
Figure 2C:
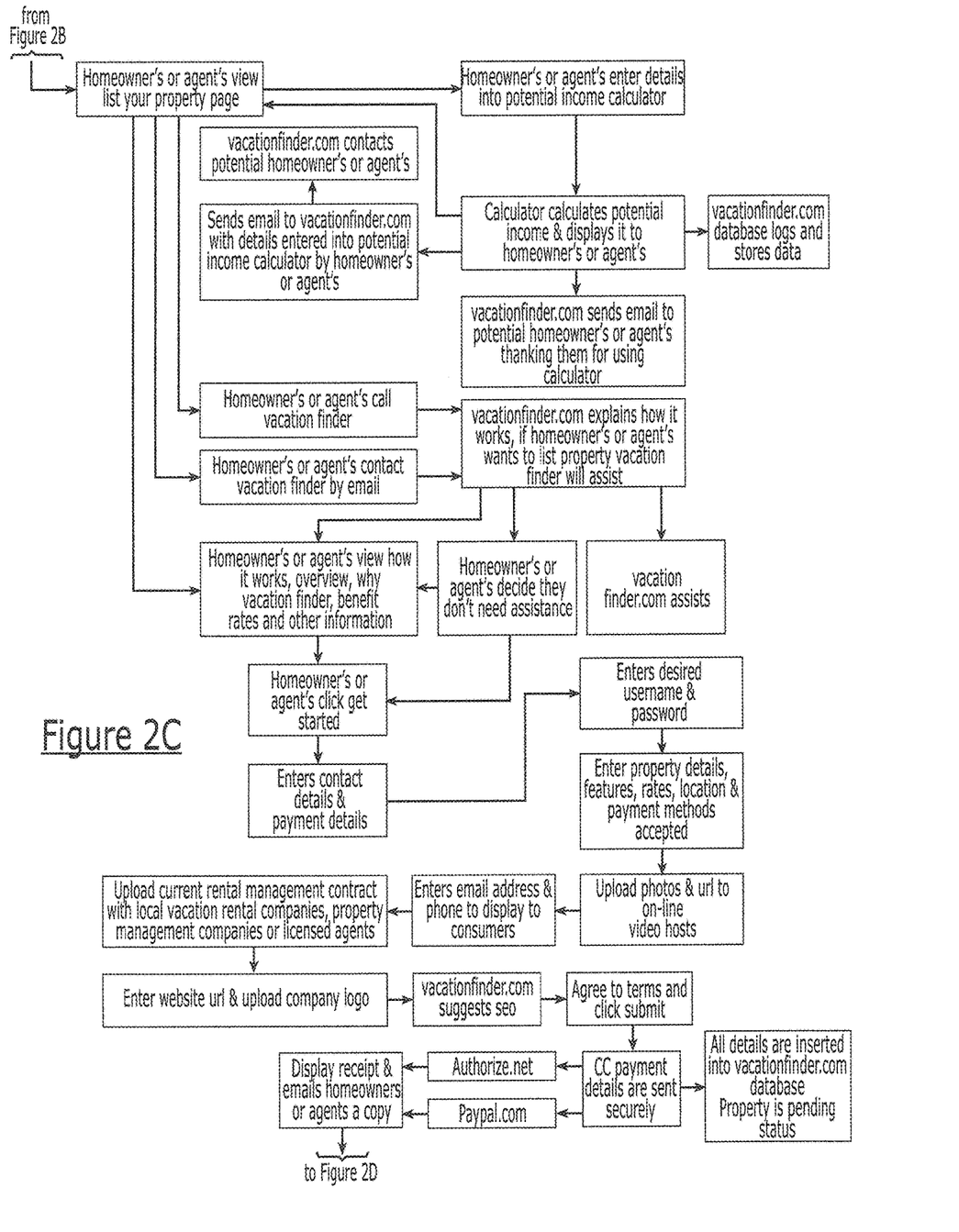
Figure 2D:
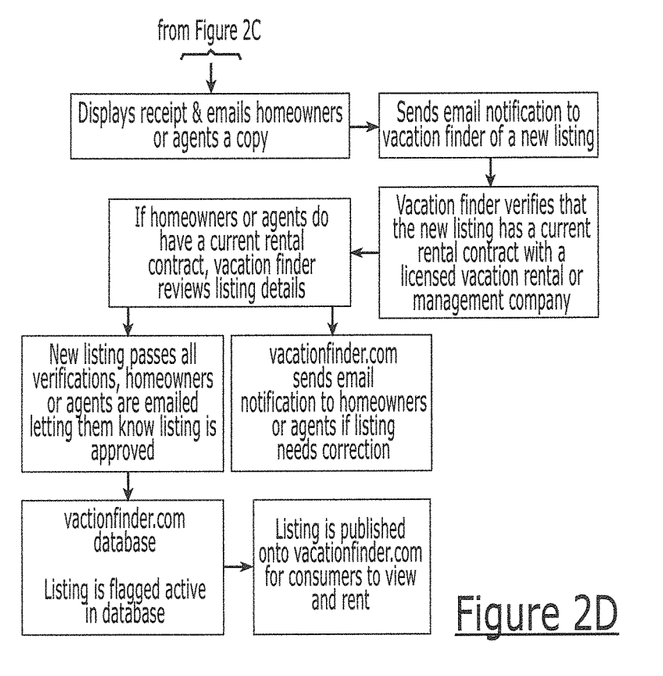

With regard to FIGS. 2A, 2B, 2C and 2D, various aspects of the disclosure are shown from perspectives of homeowners, property owners, agents and advertisers. FIG. 2A particularly shows how may view how embodiments of the disclosure work for homeowners or agents. The homeowner or property owner may see an overview, learn about features and what they receive for joining, inspect rates and find other information and details for listing the property. As shown in FIG. 2A homeowners, agents or advertisers can fill in form fields to register for an "Advertising Center Account" and then register a property. In FIGS. 2B and 2C the owner or agent may enter property rental details into a potential income calculator based on rental parameters such as asking price and term of rental. As further shown in FIG. 2C, the user will upload current rental management contracts with local vacation rental companies, property management companies or licensed agents as well as photographs or identifying sources for the property. In FIG. 2D, the listing process is completed and potential consumers can view and rent the listed property as described above with respect to FIGS. 1A-1C.

Figure 3:
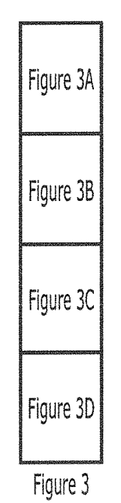
FIGS. 3A-3D form a flowchart showing a system architecture according to an aspect of the disclosure.
Figure 3A:
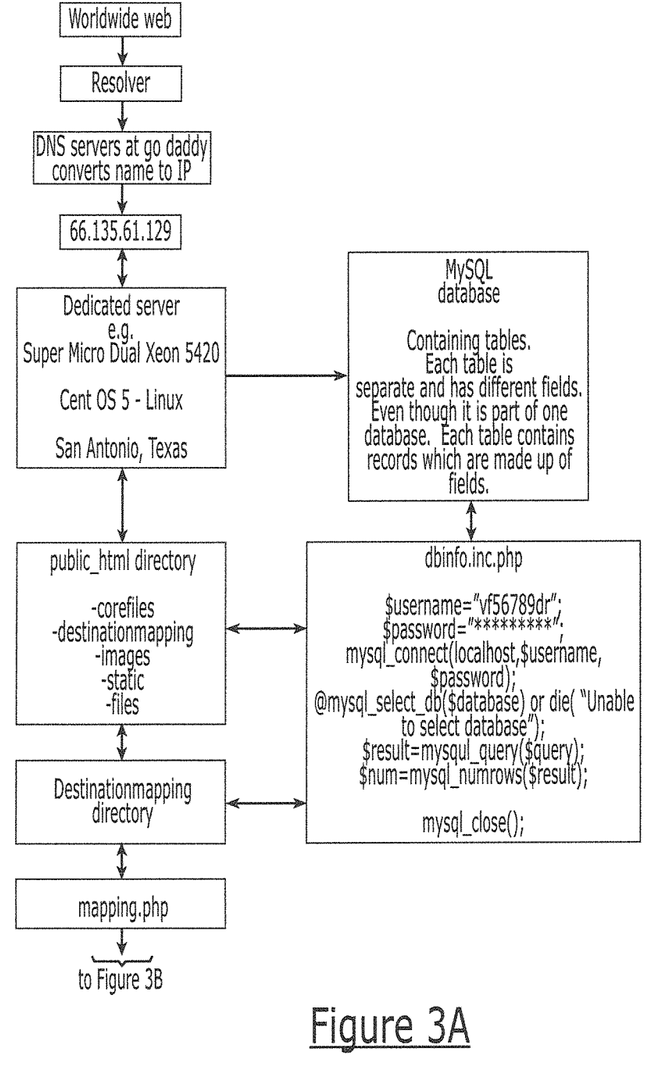
Figure 3B:
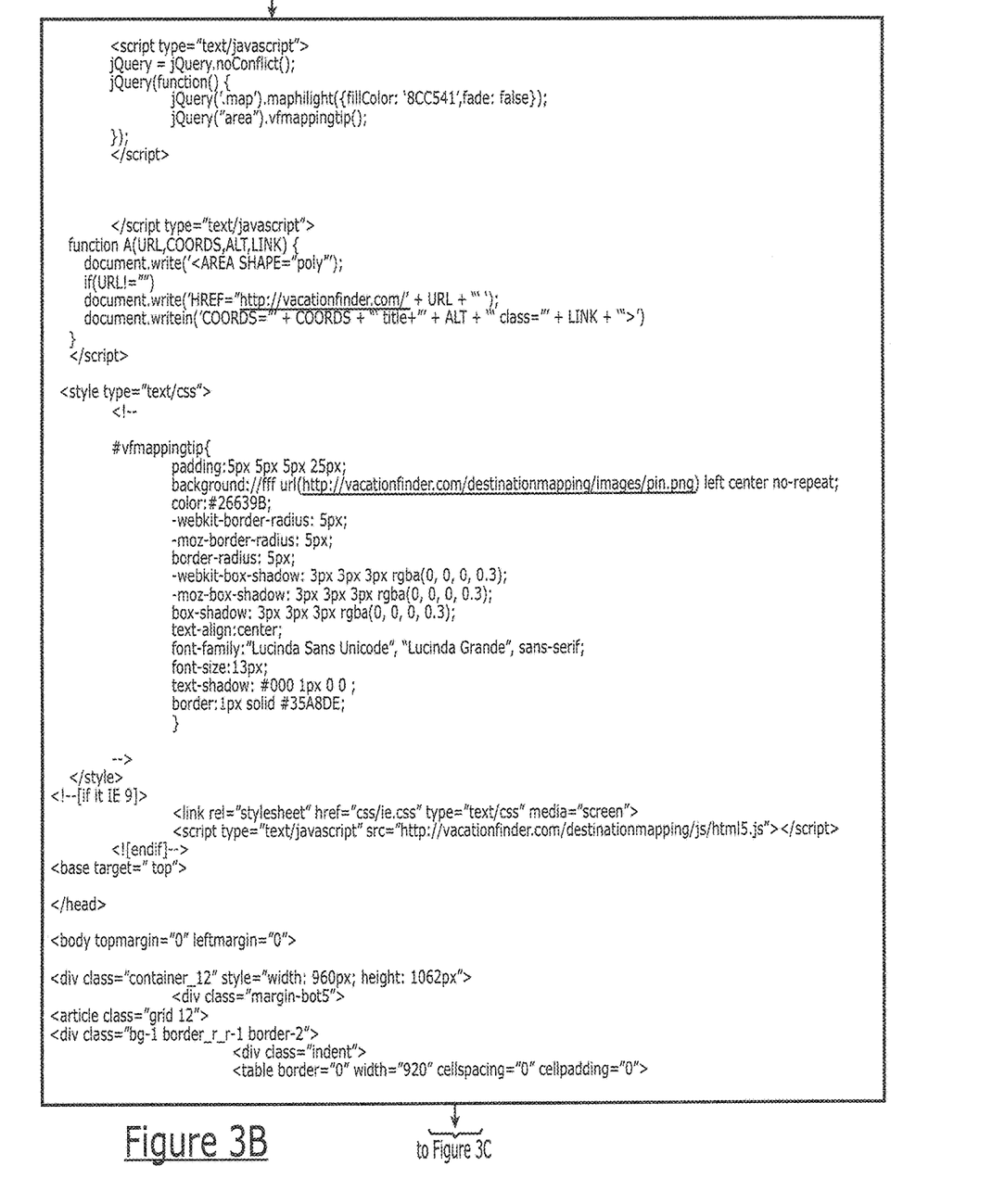
Figure 3C:
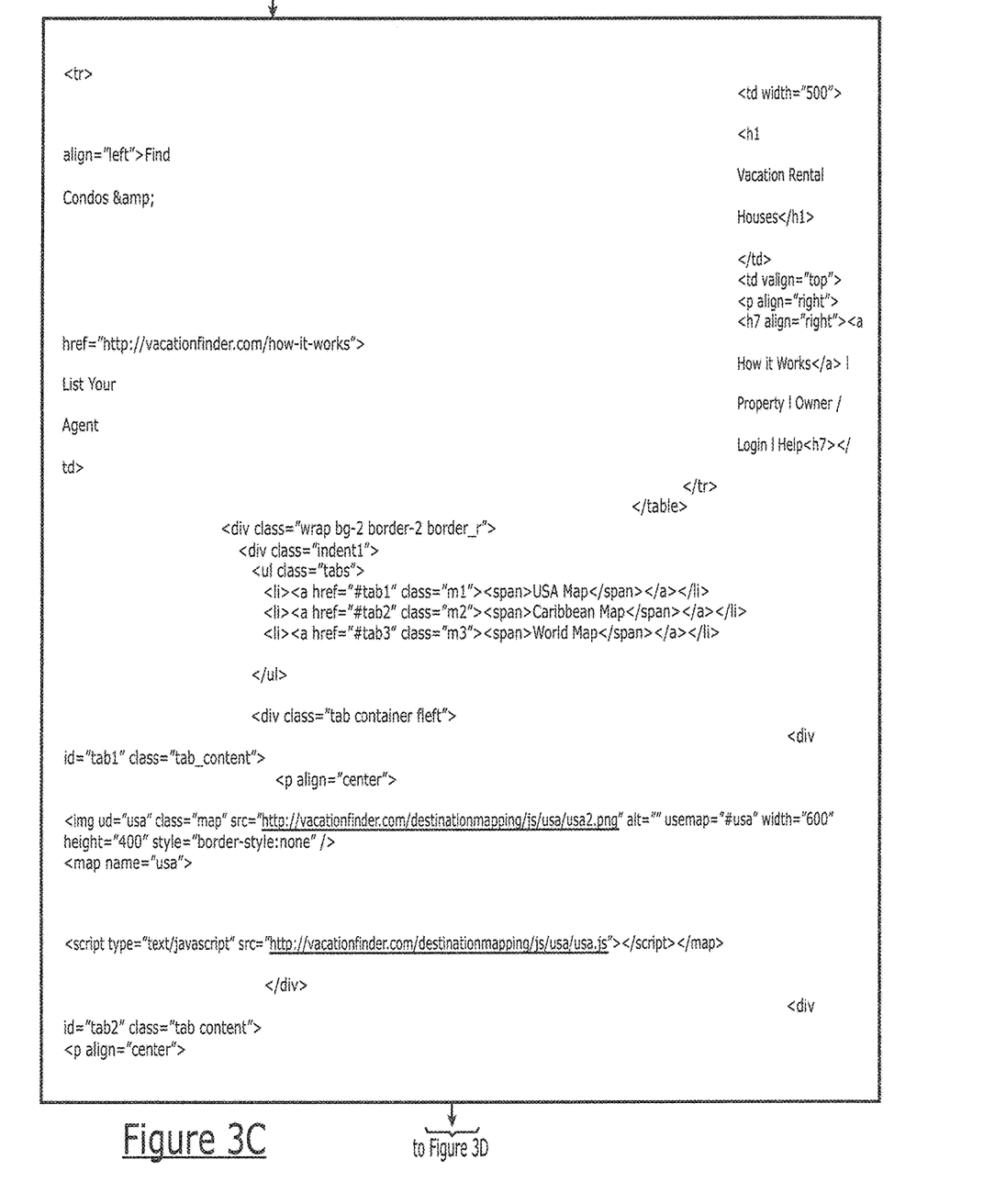
Figure 3D:
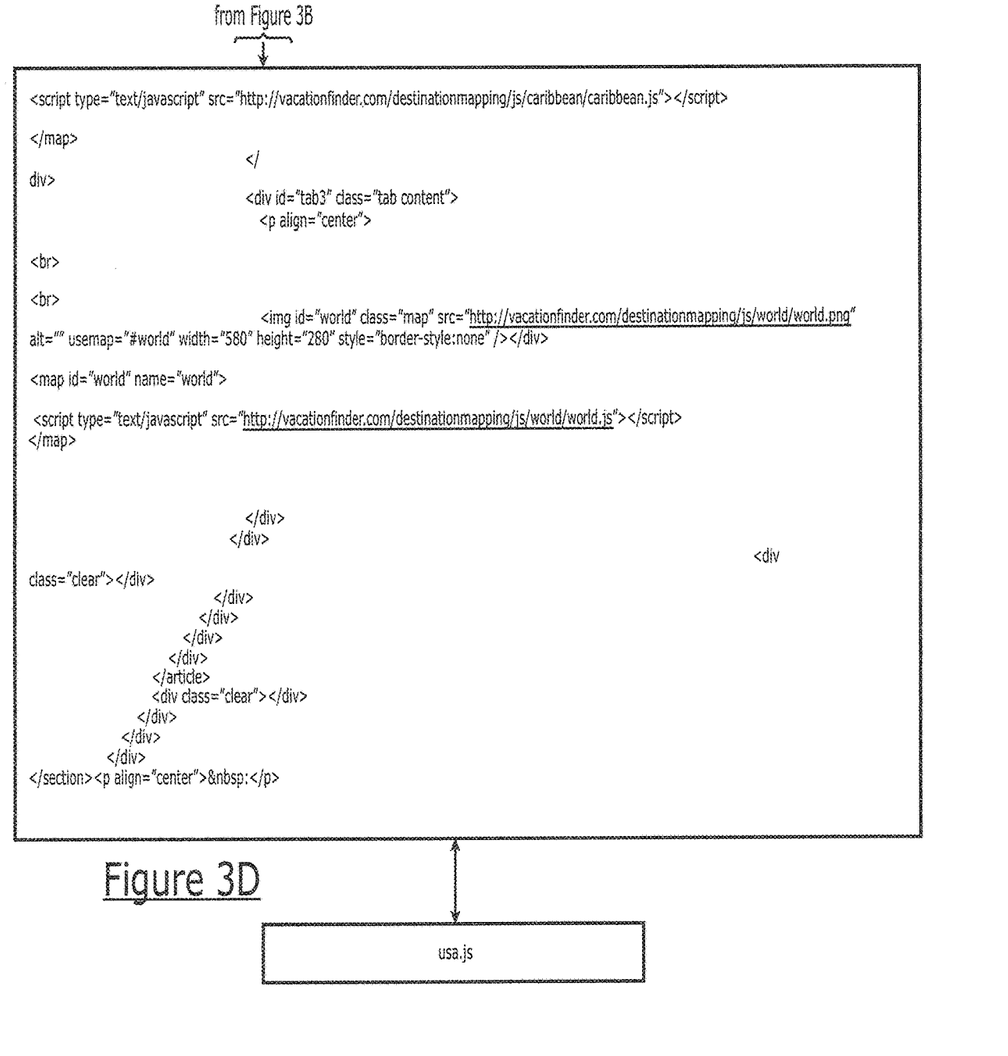

FIGS. 3A, 3B, 3C and 3D show a system architecture according to an aspect of the disclosure. In general, server and system relationships and database mapping functions including MySQL database, destination mapping, directories and servers are shown. FIG. 3A particularly shows destination mapping functions. FIG. 3B shows source code including coordinates. FIG. 3C shows source code including uploaded maps. FIG. 3D shows source code including JavaScript.

Figure 4:
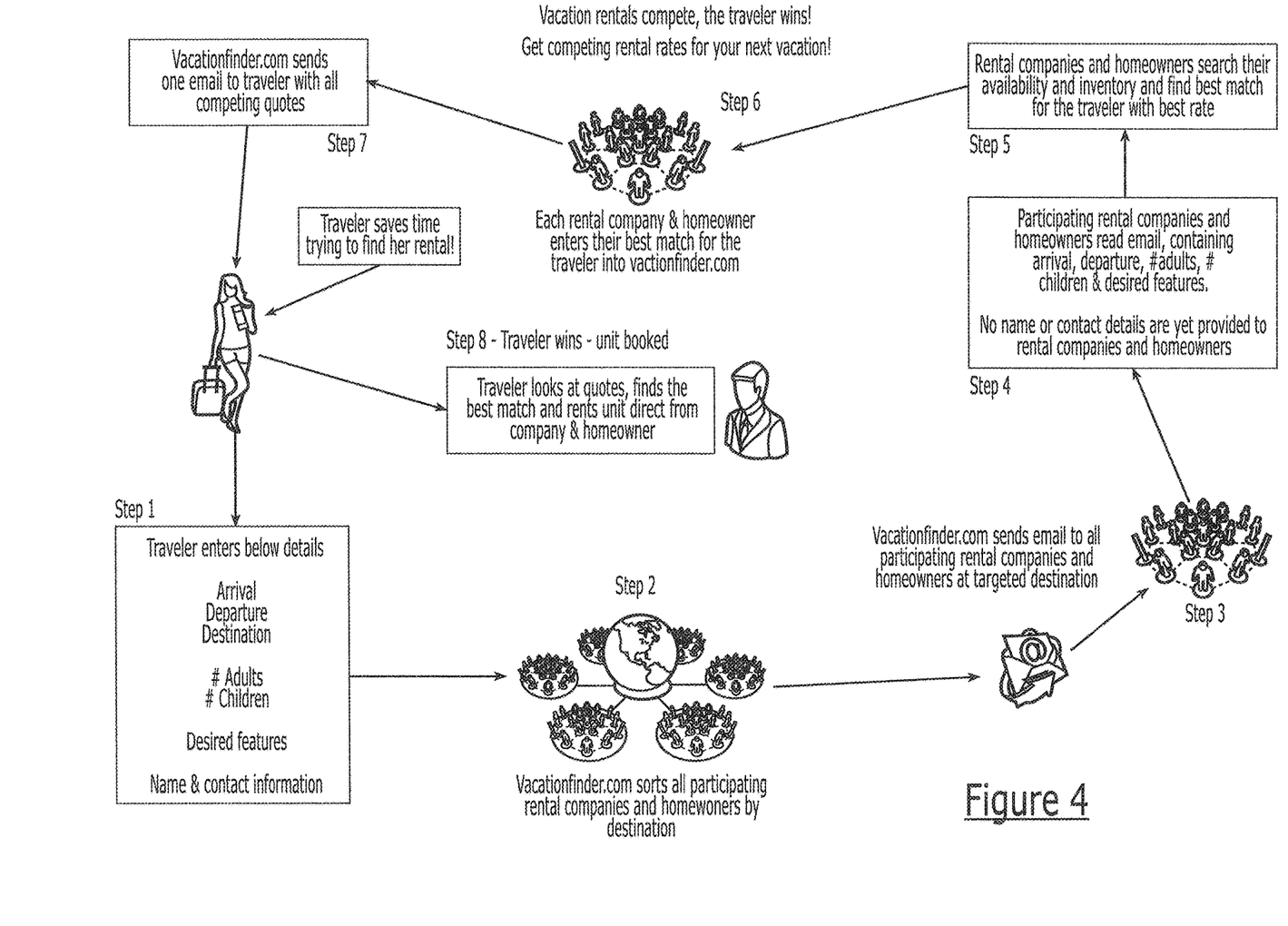
FIG. 4 is a flowchart showing a system architecture according to an aspect of the disclosure.

FIG. 4 is a flowchart showing another aspect of the present disclosure in which a prospective renter or traveler enters desired information on a website according to an embodiment of the present disclosure. As shown in Step 1, the traveler enters details such as arrival and destination information into a host site such as www.vacationfinder.com. In Step 2, the site sorts destination information based on participating rental companies and homeowners. In Steps 3 and 4, the site contacts targeted destination companies and property owners. In Step 5 the targeted companies or agents search available properties to identify best matches based on the traveler's desires. In Step 6 the companies or agents respond to the site with their best matches. In Step 7 the site responds to the traveler with competing quotes from the property owners or agents. In Step 8 the traveler chooses the quoted property that best matches the traveler's desires and books or reserves the rental property.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

That which is claimed is:

1. A method of electronically selecting and reserving a rental property, comprising:

uploading a plurality of property service contracts into a first web page of a host site;

uploading a plurality of rental properties from respective private owners or private owner properties managed by rental management companies into a search portal of the host site, each rental property being associated with a respective property service contact, the search portal being coupled to the host site and programmed for activation to: (i) receive from a web browser of a computer user an input forming a query; (ii) in response to the input, automatically retrieve data corresponding to the query; and (iii) using the data retrieved, automatically generate and transmit to the web browser a second web page that displays: (A) information associated with the query associated with the first web page activated by the host site, and (B) a view corresponding to the query, wherein the activation comprises;

entering a keyword into the search portal or selecting a destination site;

causing the keyword or the destination site to translate a source code into an executable code; and causing the executable code to provide and return a concierge form with a suggested property or the destination site in real time from among hundreds of properties around the world to the user, the suggested property being managed by one of the private owners of the suggested property and serviced by an agent proximate the property, the agent having one of the property service contracts with the owner of the suggested property, the contract being verified by the source code before the suggested property is published to the user.

2. The method as in claim 1 wherein the suggested property is a plurality of properties.

3. The method as in claim 2, further comprising sorting the properties.

4. The method as in claim 1, further comprising sharing the suggested property to a social media website.

5. The method as in claim 1, further comprising viewing the suggested property by one of selecting photograph slides or by selecting photograph icons.

6. The method as in claim 1, further comprising storing user details into a MySQL database.

7. A system serving web pages offering rental properties, the system comprising:
   (a) an interactive concierge shop containing data, for each of a plurality of first web pages, defining a plurality of visually perceptible elements, which visually perceptible elements correspond to the plurality of first web pages, the interactive concierge shop belonging to a host;
      (i) wherein each of the first web pages belongs to one of a plurality of property owners, each first web page being generated when the property owner receives verification by the interactive concierge shop of a respective service contract with a property management company proximate a property;
      (ii) wherein each of the first web pages displays at least one active link associated with the property associated with a rental opportunity of a selected one of a plurality of the property owners; and
      (iii) wherein the selected property owner, the host, and a computer user are each third parties with respect to one other;
   (b) a computer server at the host, which computer server is coupled to the concierge shop and programmed to:
      (i) receive from the web browser of the computer user a query;
      (ii) automatically identify one of the first web pages corresponding to the query;
      (iii) in response to identification of the first web page, automatically retrieve stored data corresponding to the query; and
      (iv) using the data retrieved, automatically generate and transmit to a web browser of the computer user a second web page that displays:
         (A) information associated with the property generated in real time from among hundreds of properties around the world and associated with the corresponding first web page, and
         (B) a view of the property corresponding to the information; and
      (v) produce and separately deliver property owner, host and computer user forms in real time to the respective property owner, host, and computer user based on the generated information.

\* \* \* \* \*